(12) United States Patent
Jones

(10) Patent No.: US 9,625,085 B1
(45) Date of Patent: Apr. 18, 2017

(54) BUCKET STAND KIT

(71) Applicant: Betty Jones, Louisburg, NC (US)

(72) Inventor: Betty Jones, Louisburg, NC (US)

( * ) Notice: Subject to any disclaimer, the term of this patent is extended or adjusted under 35 U.S.C. 154(b) by 0 days.

(21) Appl. No.: 15/135,218

(22) Filed: Apr. 21, 2016

(51) Int. Cl.
| | |
|---|---|
| *F16M 11/04* | (2006.01) |
| *F16M 11/26* | (2006.01) |
| *F16M 11/32* | (2006.01) |
| *F16M 11/36* | (2006.01) |
| *F16M 11/38* | (2006.01) |
| *F16M 11/42* | (2006.01) |

(52) U.S. Cl.
CPC ............. *F16M 11/36* (2013.01); *F16M 11/04* (2013.01); *F16M 11/26* (2013.01); *F16M 11/32* (2013.01); *F16M 11/38* (2013.01); *F16M 11/42* (2013.01)

(58) Field of Classification Search
CPC ........ F16M 11/26; F16M 11/32; F16M 11/36; F16M 11/38; F16M 11/42; F16M 11/04; B62B 2202/028; B62B 1/264; B62B 3/104; B44D 3/14; D06F 1/00; D06F 1/02; D06F 1/04; A47G 7/025; A47G 7/041
USPC .......... 248/27.8, 97, 98, 100, 101, 146, 149, 248/150, 151, 154, 165, 166, 167, 168, 248/188.6, 313, 500; 47/39; 220/630, 220/632
See application file for complete search history.

(56) References Cited

U.S. PATENT DOCUMENTS

| | | | | |
|---|---|---|---|---|
| 155,978 | A * | 10/1874 | Royle | D06F 1/00 248/129 |
| 196,396 | A * | 10/1877 | Sprague | A47C 9/04 248/154 |
| 460,832 | A * | 10/1891 | Powell | A47G 7/025 211/85.25 |
| 516,260 | A * | 3/1894 | Bushnell et al. | D06F 1/00 248/151 |
| D31,666 | S * | 10/1899 | Steppe | 248/146 |
| 781,713 | A * | 2/1905 | Cahill | A47G 7/025 248/154 |
| 1,056,669 | A * | 3/1913 | Harris | A47G 7/025 220/630 |
| 1,125,286 | A * | 1/1915 | Flinchbaugh | B65B 67/12 248/101 |
| 1,138,141 | A * | 5/1915 | Oliver | A47G 7/025 220/630 |
| 1,393,023 | A * | 10/1921 | Hyde | D06F 1/00 248/151 |
| 1,621,260 | A * | 3/1927 | Lindemuth | D06F 1/02 220/629 |

(Continued)

*Primary Examiner* — Jonathan Liu
*Assistant Examiner* — Guang H Guan
(74) *Attorney, Agent, or Firm* — Stevenson IP, LLC

(57) ABSTRACT

A bucket stand kit including a solid support ring configured to support a lower rim of a bucket with clamps and to hold a bottom end of the bucket by providing a support net, which is centrally disposed below the ring. Independently length-adjustable telescopic legs hingedly attached to the ring support the bucket secured within the support ring so that the bucket is level on both flat, even surfaces and uneven surfaces, such as roofs, stairs, or ramps. The legs are foldable for transport and storage. A non-slip foot and a caster wheel are alternately engageable to the distal end of each leg. In addition, a cushioned liner is continuously disposed along the entire inner portion of the ring to assist in ensuring that the bucket is secured within the support ring.

4 Claims, 5 Drawing Sheets

(56) References Cited

U.S. PATENT DOCUMENTS

| | | | | |
|---|---|---|---|---|
| 3,414,311 | A | * 12/1968 | Trimboli | B44D 3/14 248/210 |
| 4,223,859 | A | 9/1980 | Erickson | |
| 4,398,690 | A | * 8/1983 | Rutledge | B44D 3/14 108/28 |
| 4,562,983 | A | * 1/1986 | Klefbeck | B65B 67/12 248/97 |
| 4,889,300 | A | * 12/1989 | Gibson | B65B 67/12 248/101 |
| 5,183,280 | A | 2/1993 | Gresch | |
| 5,193,770 | A | * 3/1993 | Kildare | B65B 67/1233 248/101 |
| 6,116,549 | A | * 9/2000 | Santa Cruz | B65B 67/12 248/97 |
| 6,494,416 | B2 | * 12/2002 | Wang | A63B 55/53 248/166 |
| 6,776,379 | B2 | * 8/2004 | Sherer | B65D 25/24 248/150 |
| 7,293,748 | B1 | 11/2007 | Hoser | |
| 7,845,656 | B2 | * 12/2010 | Thompson | B25H 3/00 280/47.35 |
| 8,333,394 | B1 | * 12/2012 | Cisneros | B44D 3/14 280/47.34 |
| 8,783,241 | B1 | * 7/2014 | Sauter | F24C 1/16 126/25 A |
| 8,807,493 | B2 | * 8/2014 | Kamon, II | A47G 7/041 248/129 |
| 9,060,469 | B2 | * 6/2015 | Kamon, II | A01G 17/04 |

* cited by examiner

– 1 –
BUCKET STAND KIT

BACKGROUND OF THE INVENTION

Various types of containers and holders for the containers are known in the prior art. However, what is needed is a kit providing a height-adjustable container-elevating bucket stand having telescopic and foldable legs with interchangeable static feet and caster wheels and a telescopic lock-down structure for securing a bucket to the bucket stand.

FIELD OF THE INVENTION

The present invention relates to containers, and more particularly, to a height-adjustable container-elevating bucket stand.

SUMMARY OF THE INVENTION

The general purpose of the present bucket stand kit, described subsequently in greater detail, is to provide a bucket stand kit which has many novel features that result in a bucket stand kit which is not anticipated, rendered obvious, suggested, or even implied by prior art, either alone or in combination thereof.

To accomplish this, the present bucket stand kit is devised to level a bucket and the contents thereof. The instant buck stand kit includes a solid support ring configured to support a lower rim of a bucket with clamps and to hold a bottom end of the bucket by providing a support net, which is centrally disposed below the ring. Independently length-adjustable telescopic legs hingedly attached to the ring support the bucket secured within the support ring so that the bucket is level on both flat, even surfaces and and uneven surfaces, such as roofs, stairs, or ramps. The legs are foldable for transport and storage. A non-slip foot and a caster wheel are alternately engageable to the distal end of each leg. In addition, a cushioned liner is continuously disposed along the entire inner portion to assist in ensuring that the bucket is secured within the support ring.

The present device is formed of strong, lightweight, rust-resistant materials. As an example, the legs may be formed of aluminum. The support ring may be formed of a rubberized material or other material which is compatible with the structure and purpose of the present device. The bucket stand can hold a bucket weighing up to fifty pounds and is devised to hold the contents evenly.

Thus has been broadly outlined the more important features of the present bucket stand so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
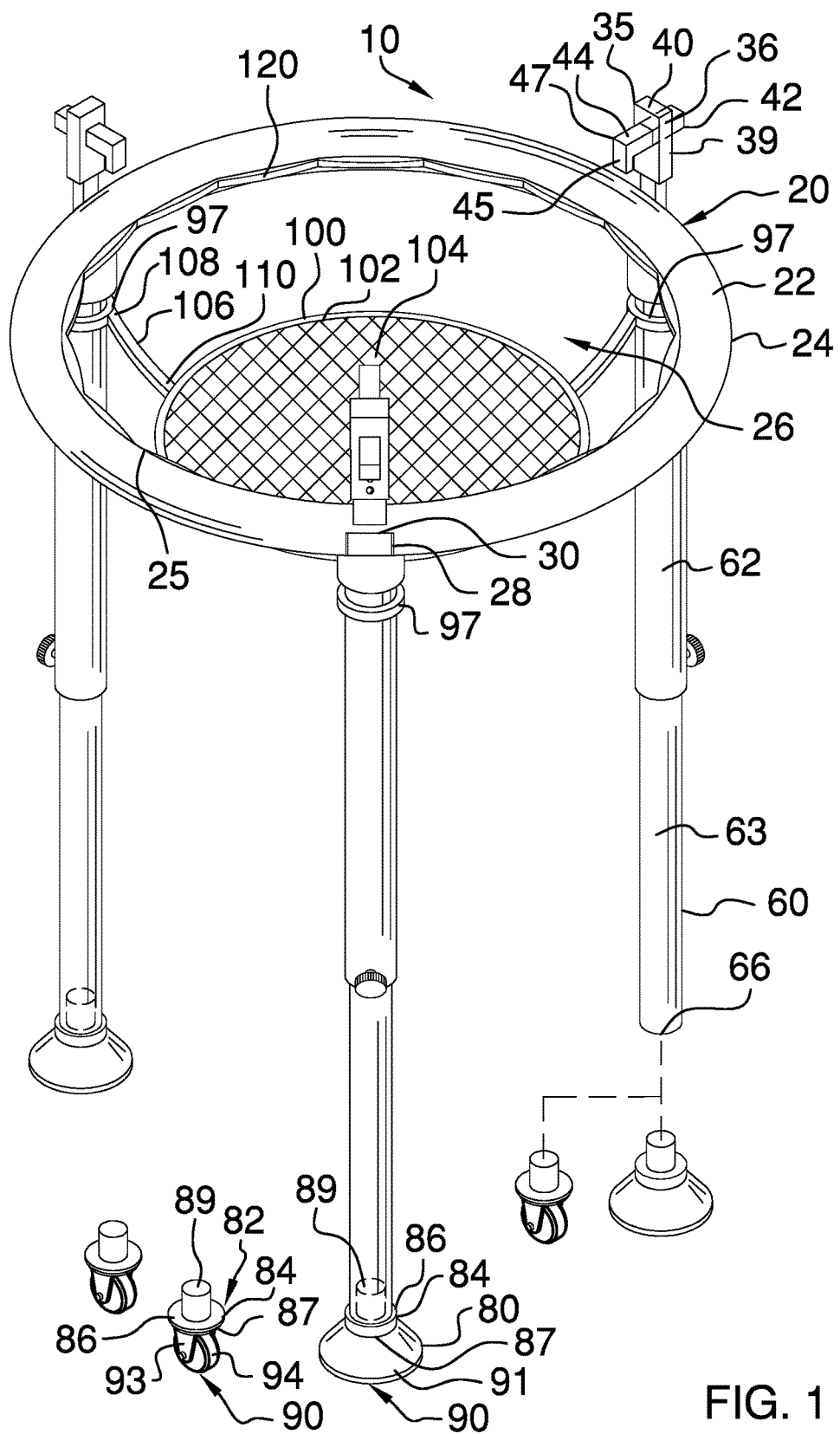
FIG. 1 is an isometric view.
Figure 2:
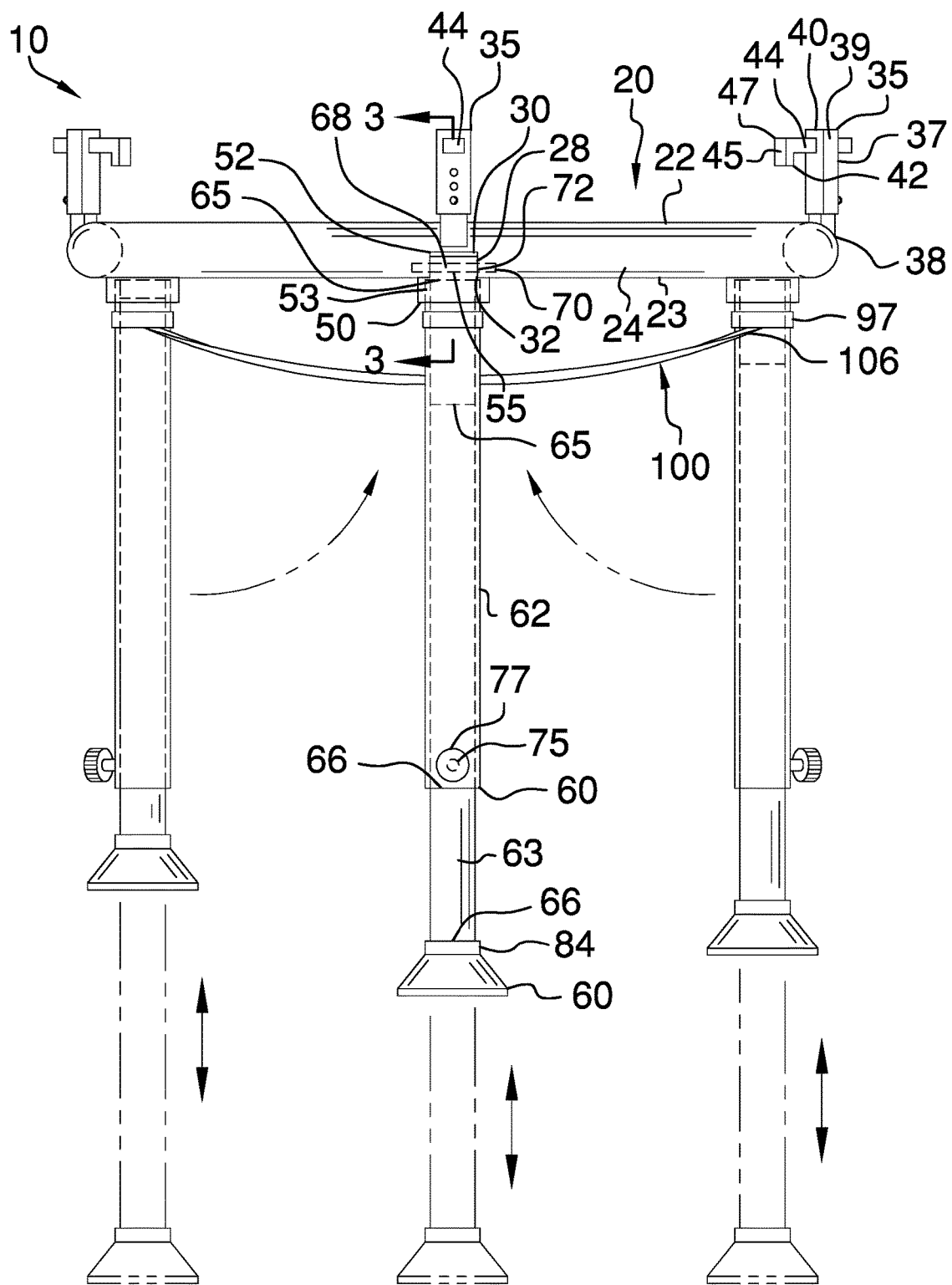
FIG. 2 is a side elevation view.
Figure 3:
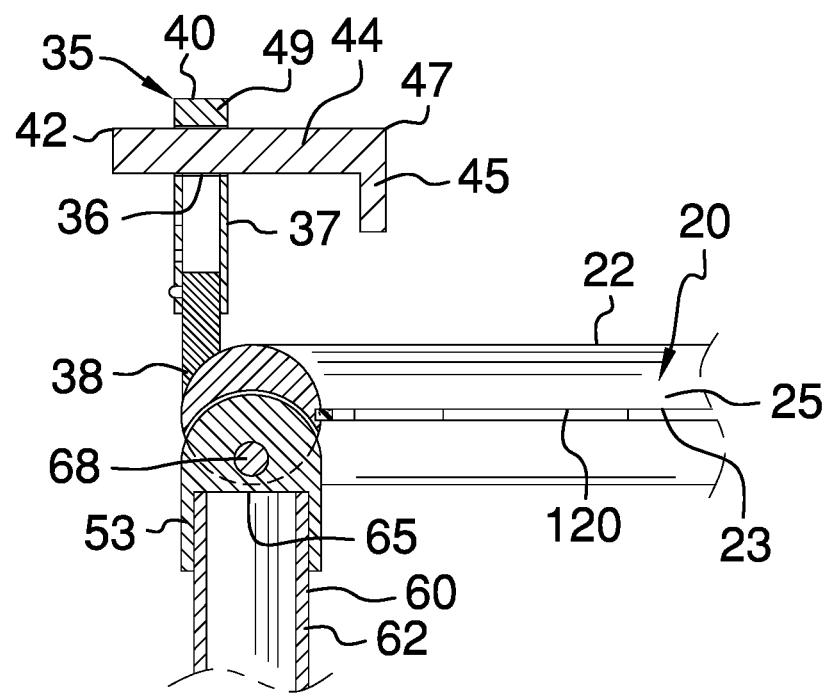
FIG. 3 is a cross-sectional view taken along line 3-3 of FIG. 2.
Figure 4:
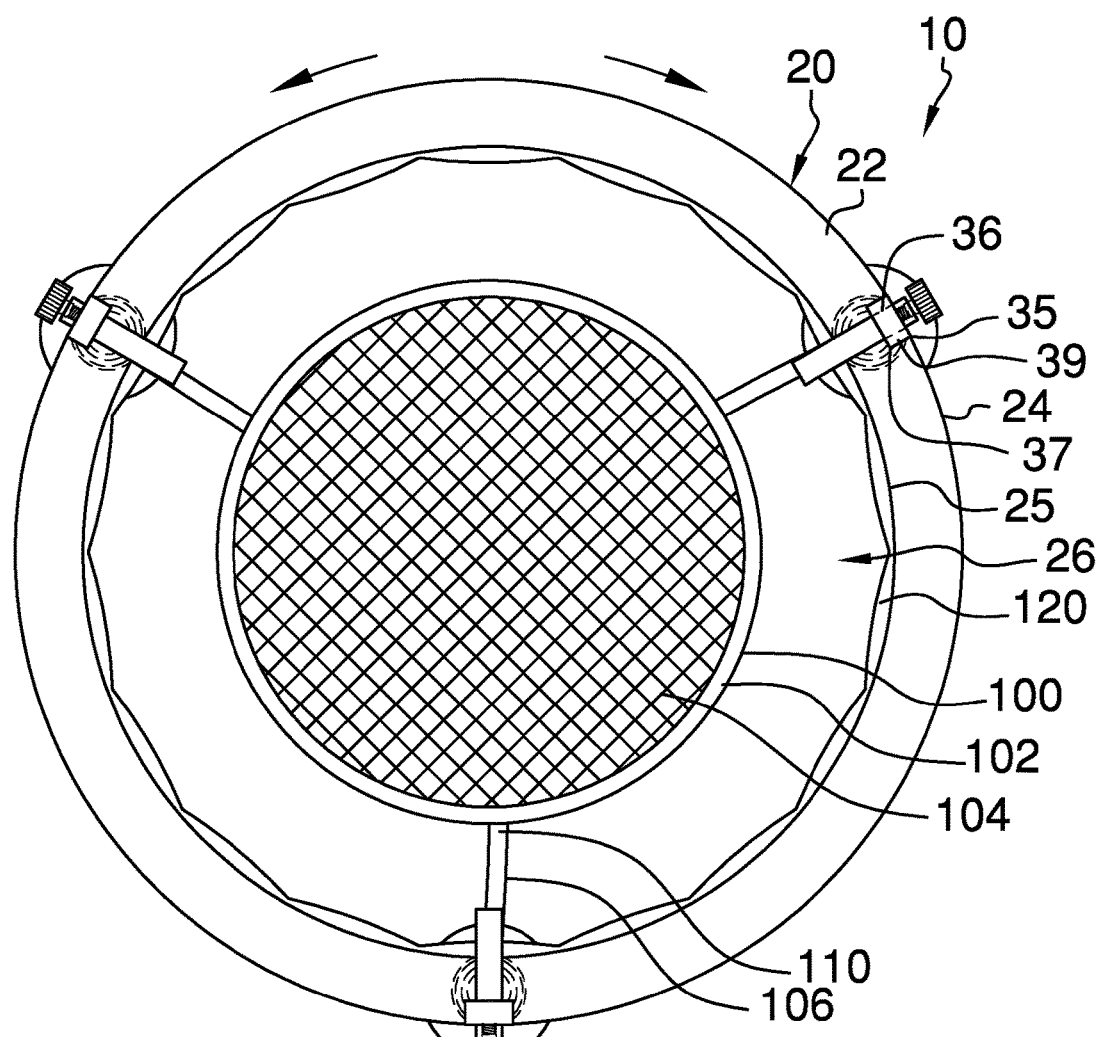
FIG. 4 is a top plan view.
Figure 5:
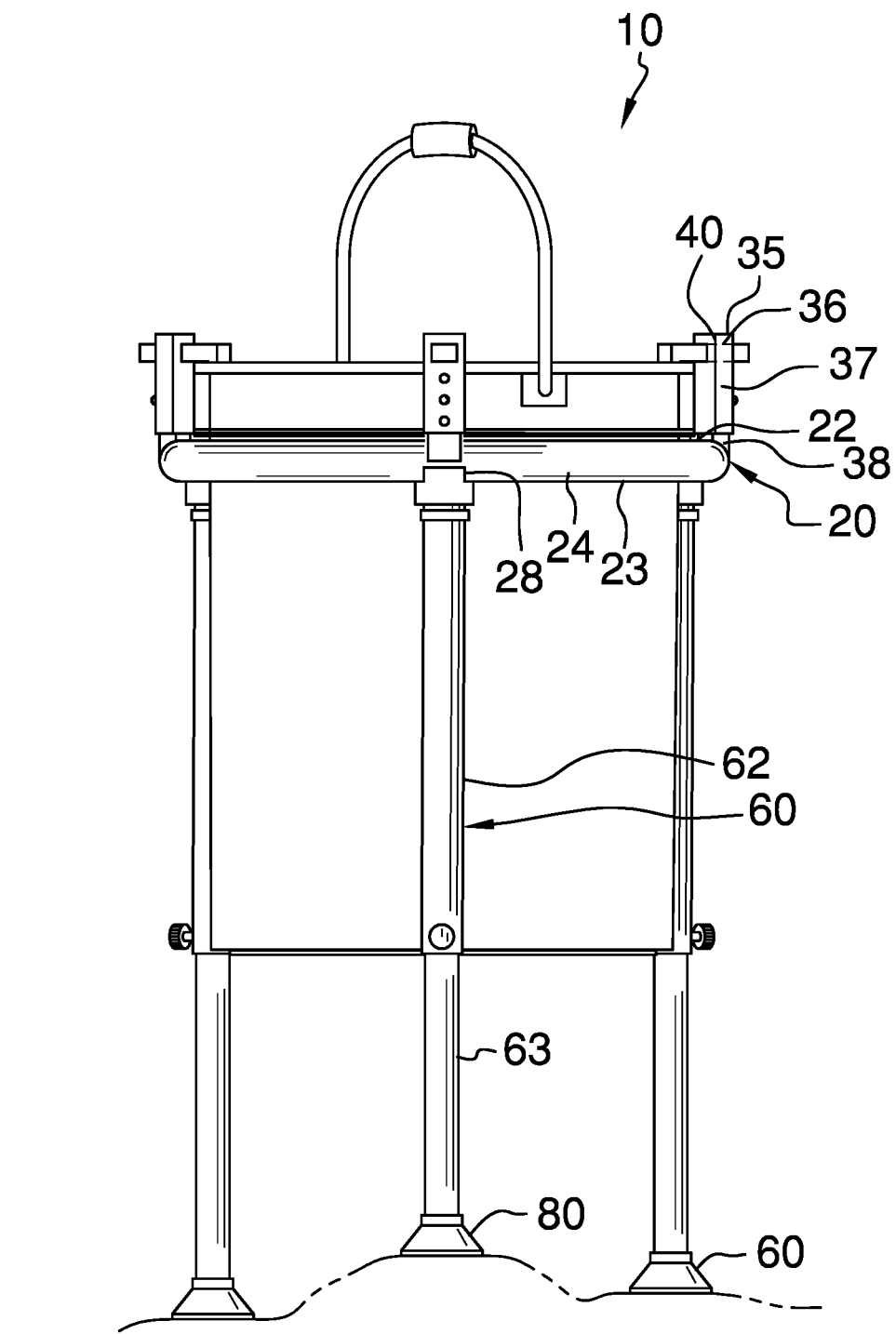
FIG. 5 is an in-use side elevation view showing a plurality of telescopic legs extended in varying lengths to situate a bucket stand on uneven terrain.

With reference now to the drawings, and in particular FIGS. 1 through 5 thereof, an example of the instant bucket stand employing the principles and concepts of the present bucket stand and generally designated by the reference number 10 will be described.

Referring to FIGS. 1 through 5, the present bucket stand kit 10 devised to support and elevate a bucket is illustrated. The bucket stand kit 10 includes a solid support ring 20 having a substantially circular cross-section. The support ring 20 has a top portion 22, a bottom portion 23, an outer portion 24, an inner portion 25, and a continuous orifice 26 defined by the inner portion 25. The top portion 22 is configured to support a lower rim of a bucket. A plurality of notches 28 is disposed in the outer portion 24. Each of the notches 28 has an interior end 30 and open exterior end 32.

A plurality of clamps 35 is provided to secure the lower rim of the bucket to the support ring 20. Each of the clamps 35 includes a stem 37 disposed on the outer portion 24 proximal one of the notches 28 in a position substantially perpendicular to the top portion 22 of the support ring 20. The stem 37 has a bottom end 38 disposed on the outer portion 24 and a top end 39 vertically extending above the top portion 22. An aperture 36 extends through the top end 39 and parallel to the outer end 40 of the top end 39. An L-shaped arm 42 has a first section 44 fixedly engaging the aperture in a position parallel to the outer end and a second section 45 disposed on an inner end 47 of the first section 44 in a position perpendicular to the first section 44 and directed toward the top portion 22 of the support ring 20.

A plurality of hollow leg housings 50 is in contact with and connected to the bottom portion 23 of the support ring 20 in a position perpendicular to the bottom portion 23. Each of the leg housings 50 includes an upper portion 52 disposed within a respective one of the notches 28 and a lower portion 53 directly adjacent the bottom portion 23 of the support ring 20. The lower portion 53 has a diameter greater than a diameter of the upper portion 52. An opening 55 is disposed through the upper portion 52.

A plurality of telescopic legs 60 is provided to elevate the support ring 20 in an upright position. Each leg 60 includes an outer portion 62 and an inner portion 63 slidingly engaging the outer portion 62. The outer portion 62 has a diameter wider than a diameter of the inner portion 63. Each of the outer portion 62 and the inner portion 63 has a proximal end 65. The proximal end 65 of the outer portion 62 is disposed within the respective lower portion 53 of the leg housing 50. Each of the outer portion 62 and the inner portion 63 also has a distal end 66. A hinge 68 is pivotably disposed through the respective opening 55. The hinge 68 has a pair of exterior ends 70 engaging the support ring 20 on the bottom portion thereof proximal the respective one of the notches 28. The hinge 68 permits the legs 60 to fold for transport and storage of the device 10. Further, because each of the legs 60 is independently telescopic, the length 60 of each leg 60 can be separately adjusted to accommodate installations on both flat and uneven surfaces, such as roofs, stairs, or ramps.

A hole 75 is disposed proximal the distal end 66 of the outer portion 62. A set screw 77 is engagable to the hole 75. The set screw 77 is configured to frictionally engage the inner portion 63 to secure the inner portion 63 at a selected length relative the outer portion 62.

A foot 80 and a caster wheel 82 are alternately engageable to the distal end 66 of the inner portion 63. Each of the foot 80 and the caster wheel 82 has a disc 84. The disc 84 has an upper portion 86 and a lower portion 87 as well as a cylindrical attachment member 89 vertically disposed atop the upper portion 86 and a most distal end 90 disposed on the lower portion 87 of the disc 84. The attachment member 89 removably engages the distal end 66 of the inner portion 63. Each foot 80 further has a non-slip frustoconical member 91 on the most distal end 90. Each caster wheel 82 has a bracket 93 on the most distal end 90 and a wheel member 94 rotationally connected to the bracket 82.

An annular connector 97 engages the outer portion 62 of a respective one of the legs 60 proximal the lower portion 63 of the respective leg housing 50. A support net 100 is suspendingly disposed below the support ring 20 in a position parallel to the bottom side 23 and in centered alignment with the orifice 26 of the support ring 20. The support net 100 has an outer frame 102 and a net body 104 continuously spanning the outer frame 102. A plurality of spaced apart cables 106 is provided to connect the support net 100 to the connector 97. Each of the cables 106 has a first end 108 disposed on the annular connector 97 and a second end 110 disposed on the outer frame 102.

In addition, a cushioned liner 120 is continuously disposed along the entire inner portion 25. The liner 120 assists in ensuring a secure, non-slip fit of the bucket within the orifice 26.

What is claimed is:

1. A bucket stand kit comprising:
   a support ring having a substantially circular cross-section, a top portion, a bottom portion, an outer portion, an inner portion, and a continuous orifice defined by the inner portion, the top portion being configured to support a lower rim of a bucket;
   a plurality of notches formed in the outer portion, each of the notches having an interior end and an open exterior end;
   a plurality of clamps, each of the clamps comprising:
     a stem disposed on the outer portion proximal a corresponding one of the notches, the stem having a bottom end disposed on the outer portion and a top end vertically extending above the top portion;
     an aperture extending through the top end proximal an outer end of the top end and parallel to the outer end of the top end;
     an L-shaped arm having a first section fixedly engaging the aperture in a position parallel to the outer end and a second section disposed on an inner end of the first section in a position perpendicular to the first section and directed toward the top portion of the support ring;
   a plurality of hollow leg housings in contact with and connected to the bottom portion of the support ring in a position perpendicular to the bottom portion, each of the leg housings comprising:
     an upper portion disposed within a respective one of the notches;
     a lower portion directly adjacent the bottom portion of the support ring, the lower portion having a diameter greater than a diameter of the upper portion;
     an opening through the upper portion;
   a plurality of hinges, each of the hinges disposed through the opening of a corresponding one of the leg housings and pivotably connecting the corresponding one of the leg housings to the support ring, each of the hinges comprising:
     a pair of exterior ends engaging the support ring on the bottom portion thereof proximal the respective one of the notches;
   a plurality of telescopic legs, each leg comprising:
     an outer portion, wherein the outer portion has a proximal end and a distal end, the proximal end is disposed within the lower portion of a corresponding one of the leg housings;
     an inner portion slidingly engaging the outer portion, wherein the outer portion has a proximal end, a distal end, and a diameter wider than a diameter of the inner portion;
     a hole proximal the distal end of the outer portion;
     a set screw engageable to the hole, wherein the set screw is configured to frictionally engage the inner portion;
   a plurality of feet and a plurality of caster wheels, each foot and each caster wheel alternately engageable to the distal end of the inner portion of a corresponding one of the legs, each of the feet and the caster wheels comprising:
     a disc having an upper portion and a lower portion;
     a cylindrical attachment member vertically disposed atop the upper portion of the disc, wherein the attachment member is removably engageable to the distal end of the inner portion of the corresponding one of the legs;
   a plurality of annular connectors, each of the connectors engaging the outer portion of a corresponding one of the legs proximal the lower portion of the corresponding leg housings;
   a support net suspendingly disposed below the support ring in a position parallel to the bottom portion and in centered alignment with the orifice of the support ring, the support net having an outer frame and a net body continuously spanning the outer frame; and
   a plurality of spaced apart cables, each of the cables having a first end disposed on a corresponding one of the connectors and a second end disposed on the outer frame.

2. The bucket stand kit of claim 1, wherein the support ring is a solid support ring.

3. The bucket stand kit of claim , further comprising:
   a cushioned liner continuously disposed along the entire inner portion of the support ring.

4. The bucket stand kit of claim 1, wherein each foot has a non-slip frustoconical member disposed on the lower portion of the disc, each caster wheel has a bracket disposed on the lower portion of the disc and a wheel member rotationally connected to the bracket.

* * * * *